Figure 1:
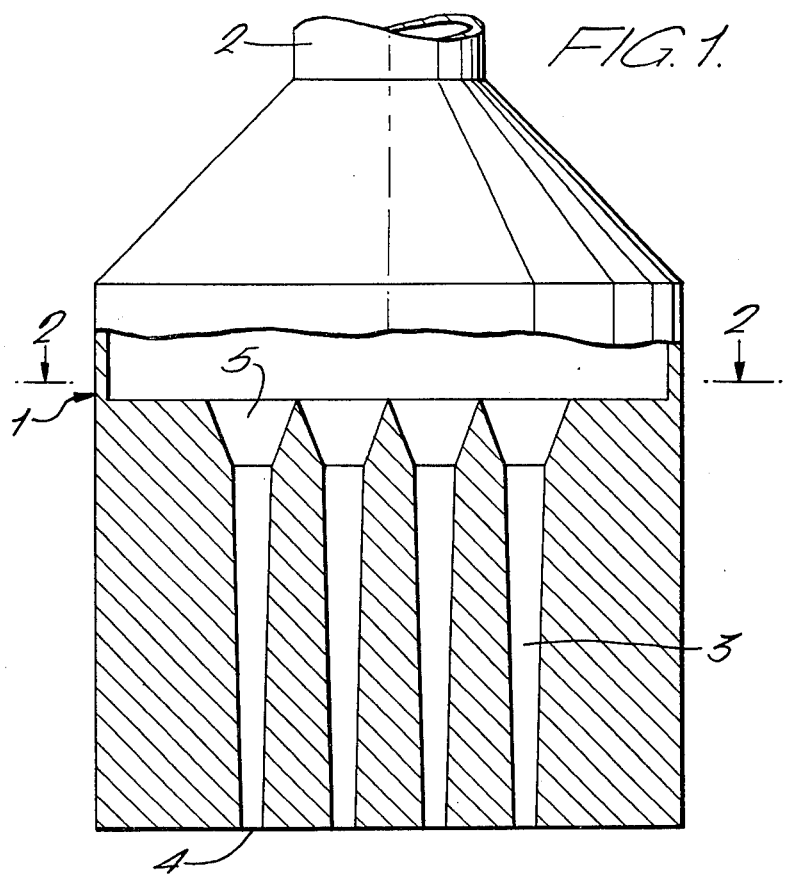

United States Patent [19]

Giles et al.

[11] 3,903,315

[45] Sept. 2, 1975

[54] PROCESS FOR MAKING A RESTRUCTURED MEAT PRODUCT

[75] Inventors: Brian Godfrey Giles; Arthur Ernest Hawkins, both of Bedford, England

[73] Assignee: Lever Brothers Company, New York, N.Y.

[22] Filed: Jan. 4, 1974

[21] Appl. No.: 431,004

[30] Foreign Application Priority Data

July 20, 1971 United Kingdom............34078/71

Related U.S. Application Data

[63] Continuation-in-part of Ser. No. 268,232, July 3, 1972, abandoned.

[52] U.S. Cl. ............... 426/388; 426/272; 426/364; 426/371
[51] Int. Cl............................................. A22c 18/00
[58] Field of Search ........... 426/274, 388, 371, 272, 426/364

[56] References Cited

UNITED STATES PATENTS

| 3,163,541 | 12/1964 | Mainhardt et al. | 426/274 |
| 3,793,466 | 2/1974 | Hawkins et al. | 426/274 |

*Primary Examiner*—Hyman Lord
*Attorney, Agent, or Firm*—Arnold Grant, Esq.

[57] ABSTRACT

A comminute of meat in which has been incorporated the fibre of set protein is extruded through fine passages to form coherent strings, and these are aligned and compressed to form a restructured product which in the cooked state has a chewing texture resembling that of cooked natural meat.

4 Claims, 2 Drawing Figures

PROCESS FOR MAKING A RESTRUCTURED MEAT PRODUCT

This application is a continuation-in-part of application Ser. No. 268,232 filed July 3, 1972, now abandoned.

This invention relates to restructured meat products.

Much of the musculature of a carcass is, though nutritionally good, associated with so much tough connective tissue that it makes poor eating. If the natural structure producing this unsatisfactory eating texture is destroyed by finely comminuting the meat with conventional equipment such as a colloid mill, hammer mill or bowl chopper, the comminute produced can be restructured into products which on cooking are much more palatable and tender than the original meat is when cooked. However, although such cooked products may have an acceptable texture, they only roughly resemble cooked natural meat; by and large, their structure is isotropic and their texture is accordingly fairly uniform.

The present invention provides a process for preparing restructured meat products which enables a closer approximation to be made to the texture that natural meat has when cooked. In a preferred form, the process provides a product which simulates remarkably closely the characteristic eating texture of cooked natural meat, which is due to the presence of whole muscle fibres arranged together in bundles.

In the process of the invention, a fibrous comminute of meat is passed through fine passages which are of length sufficient to cause the comminute to be extruded in the form of coherent strings; and the strings of extruded comminute, disposed in contact and generally in alignment with one another, are subjected to transverse pressure so as to form them into a unified mass.

Extrusion of the fibrous meat comminute through fine passages to form coherent strings exposes the comminute to conditions of shear such as to orientate at least part of the fibre content in the direction of extrusion, and this orientation of fibre is important in achieving a more meat-like eating texture in the eventual cooked product. The fibre that imparts fibrosity to the comminute need not be (though it conveniently is) that of the type of meat subjected to comminution, and need not be of meat at all, but it must be of set (coagulated) protein as distinct from the undenatured protein of raw meat. In fact, the comminute need have no content at all of the fibre of the raw meat. Thus, meat can be chopped using a bowl chopper with the blade/bowl clearance set very fine, so that the inherent fibrous structure of the meat is practically completely destroyed, and the resulting comminute can be given a suitable fibrosity by including in it the fibre of cooked meat or spun protein fibres, for example fibres of acid-coagulated soy protein or of the heat-coagulated soy or groundnut protein compositions described in Dutch Pat. specification No. 6,912,222. Added fibre of set protein is preferably included in an amount forming from about 5 to about 30 percent by weight of the comminute.

Besides producing fibre orientation as just described, extruding the fibrous comminute through fine passages to form coherent strings also leads to a radial migration (probably towards the axis of the string) of the larger components of the comminute, leaving the surface with a composition significantly different from that of the main body of the string and of low adhesiveness i.e. not easily able per se to amalgamate or fuse with the like surfaces of adjacent strings. The pressure that is applied transversely to the aligned strings to form them into a unified mass is kept below that which would lead to substantial forced transfer of material between the strings; i.e. substantial mixing of the material composing adjacent strings is avoided. The strings then retain their essential individuality even though the mass appears in transverse section to be homogeneous and without structure. When, however, the mass is cooked, the concurrent setting of the proteins causes the strings to 'recollect' their individuality, and with knife and fork they become axially separable relatively easy, behaving similarly to the fibre bundles of cooked natural meat.

The fine passages through which the meat comminute is passed to form it into strings are suitably of cross-sectional area from about $1mm^2$ to about $10mm^2$, of length sufficient to produce a coherent string as distinct from the fragmented material that is produced by mincing meat through a fineapertured plate. Passages of length from about 1 to about 10cm are suitable; for a cross sectional area of about $1mm^2$, the minimum length of passage required is about 1cm; passages of wider section need to be longer. However, too long a passage is best avoided, for the pressure required for extrusion then becomes rather high. The passages can be flared at the entrance to facilitate the entry of the fibrous comminute. The passages need not be of uniform cross section, but may if desired taper gradually, as illustrated in the drawings that follow later. The extrusion orifice of or exit from the passages is preferably 3- or 4-sided (for example: triangular, sectoral or trapezoidal) in cross-section rather than circular or oval, to avoid producing a somewhat artificial appearance, as of textile filaments, in the eventual cooked product. The cross-sectional area of the extrusion orifice is suitably of the order of $1mm^2$. The pressure required for extrusion depends on many factors, including the fineness of the comminute and the extent of fibrosity in it and, as already indicated, the length of the extrusion passages; for passages of 1 – 10cm length, extrusion will usually be carried out under a pressure in the range 10 – 100 psi ($0.7 – 7.0$ $kg/cm^2$). In order to facilitate smooth extrusion of the meat comminute, extrusion is preferably carried out with the use of a piston exerting constant pressure, rather than one which sweeps out constant volume in unit time.

Upon extrusion, the strings of fibrous meat comminute can be deposited onto a suitable surface so that a pile of suitable width and height is formed in which the strings are generally parallel to one another. This can conveniently be done by depositing the strings, optionally with some amalgamation of them achieved by exposure too the pressure exerted by inwardly directed streams of air, downwardly onto a platform moving beneath the extrusion orifices, say 5 – 15 cm or more below them. The pile is then subjected to transverse pressure i.e. to pressure in a direction transverse to the general direction of the strings forming the pile, until a unitary mass is formed; this pressure will be in the range 1 – 10 p.s.i. ($0.07 – 0.7$ $kg/cm^2$). As already stated, application of pressure is not continued to the point where any substantial mixing occurs of the material composing adjacent strings of comminute. In practice, with pressure applied to the longitudinal surfaces of the pile, this pressure is of the order of 1 psi (0.07 kg/cm²). Pressure is conveniently applied by means of a loaded plate. In an alternative procedure for unifying the strings of the pile, the pile is maintained in a vessel and the pressure of the atmosphere in the vessel is reduced, suitably to about 1 psi, by means of an oil or water pump, in order to remove from the interstices of the pile part or all of the air occluded in it. The pile is then re-connected with the ordinary atmosphere, and the resulting sudden flow of air to its exposed surfaces brings about the desired compaction and unification of the strings. Some degree of control of the texture of the eventual cooked product can be obtained by adjusting the extent of compression of the pile, from that needed just to form a unitary mass up to that at which mixing of string material occurs.

It will be apparent from the foregoing description that, when the extruded strings of fibrous meat comminute are disposed in contact and generally in alignment with one another, that contact is direct: there is no interposition of binding agent or adhesive e.g. collagen, such as is an essential feature of the process described in Mainhardt et al U.S. Pat. No. 3 163 541, according to which meat muscle fibre is finely ground, and extruded in a series of parallel fine strands of fibres, and the fibres are then coated with binder and subsequently pressed together to form a composite product having the characteristic structure of high quality steak. Mainhardt et al emphasise the importance of applying coating material immediately upon extrusion of the fibres in order to coat each of them uniformly. However, coating and particularly uniform coating of the extruded fibres is an operation which is very difficult to perform without displacing the fibres from the desired alignment.

The unified mass formed by the compression step in the method of our invention can be frozen or chilled, for sale in the raw, uncooked state. Alternatively, it can be heat-set before sale, suitably by heating until a centre temperature of at least 60°C is attained. Such heat-set material is specially suitable for sale in the form of chucks in gravy or a sauce, to be reheated before serving. To produce an end product of the kind just mentioned, it is desirable to include in the initial comminute a small amount of savoury flavouring such as meat extract, since during reheating the chucks do not readily absorb flavour from the surrounding liquor.

Figure 2:
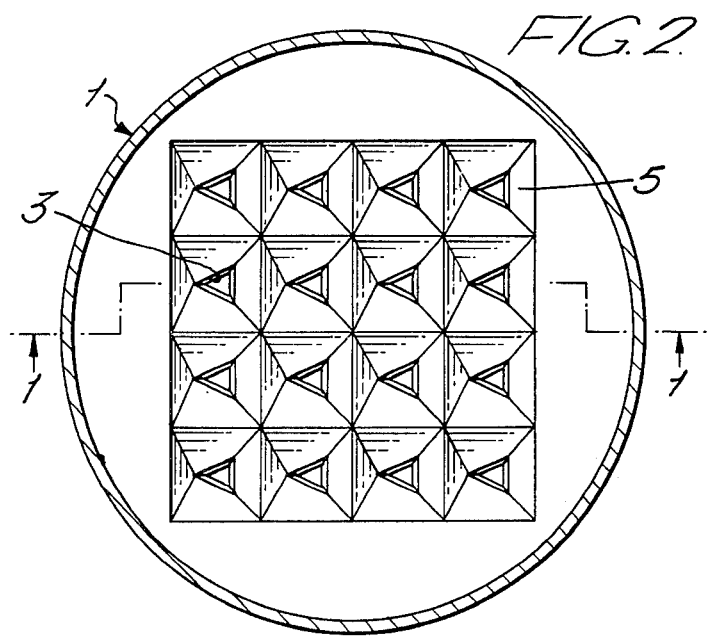

A form of extrusion nozzle for use in carrying out the process of the invention is shown in the accompanying drawings, in which:

FIG. 1 shows the nozzle diagrammatically, partly in side elevation and partly in vertical section, viewed in the direction of the arrows 1 — 1 in FIG. 2; and FIG. 2 is a schematic view in the direction of the arrows 2 — 2 in FIG. 1.

The nozzle 1, which can be supplied with fibrous meat comminute by a feed pipe 2, includes a number of gently tapering passages 3 which, through their main length and at their exits 4, are of triangular section. The passages may for example taper from 3mm (base) × 6mm (height) to 1mm × 2mm at the exits 4. The entrances 5 to the passages 3 are sharply tapered.

An alternative form of extrusion nozzle for use in carrying out the process of the invention comprises a generally cylindrical or frusto-conical solid core carrying a series of grooves in its curved peripheral surface, and a sleeve which encloses the core and defines, in conjunction with the peripheral grooves of the core, a series of fine passages which extend axially of the core. These passages are preferably of uniform sectoral or generally trapezoidal section throughout their length, and are provided with tapered entrances to facilitate the entry of fibrous meat comminute into them.

The invention is applicable to the processing of a variety of meats, and is further illustrated by the following Examples, which relate to the conversion of low quality forequarter of beef to a steak-like product.

EXAMPLE 1

A meat comminute was prepared as follows:

Frozen, boneless forequarter of beef was passed through a mincer plate having holes of diameter 3 mm, and the issuing comminute (temperature not above 10°C) was mixed with sodium chloride (1 percent by weight), cooked meat fibre (7.5 percent), and water (10 percent).

The meat fibre ingredient has been obtained by cooking cubes (of 4 cm side) of boneless topside of beef at 120°C for 1 hour, and teasing the cooked material for 15 seconds in a bowl chopper with its blade/wall gap set fairly wide (4 mm).

Unduly large pieces of cooked meat fibre were removed from the comminute by passing it through a plate perforated with holes of diameter 4 mm.

The comminute obtained as just described was extruded downwardly from the nozzle shown in the drawings into a rectangular open-ended trough reciprocated horizontally beneath the nozzle, to form a pile about 8 cm high of aligned extruded strings. A plate generally matching but very slightly smaller than the base of the trough was laid on the top of the pile, and a pressure of 1 psi (= 0.07 kg/cm²) was applied to it to form the strings into a unified mass about 2 cm high.

The trough and its contents were wrapped in aluminium foil and heated in a steam oven for 30 minutes. The cooked material was then removed from the trough, cut hot into cubes of about 2 cm side, and covered with hot gravy in hot trays. It had the chewy texture and appearance of lean steak cooked in a casserole.

Even after several weeks' storage covered in foil at −20°C, the cubes had an excellent texture and appearance.

EXAMPLE 2

A unified mass of aligned extruded strings about 2 cm high was formed in a trough as in Example 1. The contents of the trough were cut through with a very blunt knife across the strings at intervals of about 2 – 3 cm.

The trough and its contents were wrapped in aluminium foil and heated in a stem oven for 30 minutes. The cooked strips of material were then removed from the trough and cut through parallel to the strings to give cubes of 2 – 3 cm side.

These cubes were covered with hot gravy in hot trays and were then stored for several weeks covered in foil at −20°C. Like the product of Example 1, the cubes had an excellent texture and a very natural appearance.

EXAMPLE 3

A pile of aligned extruded strings was prepared and compacted generally as described in Example 1, but in a very deep trough, into a unified mass about 2 cm high. The compaction plate was removed and another pile of aligned strings about 8 cm high was laid down on the unified mass. This was compacted using the plate as before, to give a total unified mass about 4 cm high.

This procedure was repeated until a unified mass about 10 cm high has been formed. This mass was cut with a blunt knife across the strings to give slabs or raw material which on frying, either immediately or after they had been stored for several weeks in polythene bags at −20°C, had an excellent texture and appearance resembling that of fried beef steak.

What is claimed is:

1. A process for making a restructred meat product from a comminute of meat, which consists of the following steps:
   i. incorporating the fibre of set protein in said comminute in an amount forming from about 5 to about 30 percent by weight of the comminute
   ii. passing the comminute containing said added fibre of set protein through fine passages of cross sectional area from about 1 mm$^2$ to about 10 mm$^2$ and of length from about 1 cm to about 10 cm and extruding said said comminute therefrom in the form of coherent strings with at least part of the fibre content orientated in the direction of extrusion
   iii. disposing the extruded strings in direct contact and generally in alignment with one another
   iv. subjecting the aligned extruded strings to transverse pressure so as to form them into a unified mass, said pressure being from about 1 to about 10 psi and such as to avoid transfer of comminute from one string to another, whereby on cooking of the unified mass the aligned strings retain their essential individuality.

2. A process according to claim 1, wherein said strings are extruded with a cross-section that is 3- or 4-sided.

3. A process according to claim 1, wherein the added fibre of set protein is the fibre of cooked meat.

4. A process according to claim 1 wherein the step of subjecting the aligned extruded strings to transverse pressure is carried out by first reducing the pressure on the aligned extruded string to about 1 psi so as to remove from the interstices between the strings at least part of the air occluded therein, and then permitting a sudden flow of air to the exposed surfaces of the strings so as to form them into a unified mass.

* * * * *